US012728414B2

(12) United States Patent
Donkers et al.

(10) Patent No.: US 12,728,414 B2
(45) Date of Patent: Sep. 8, 2026

(54) CONDITIONING CHAMBER FOR DUAL-INTERFACE FLUIDIC SYSTEM

(71) Applicant: Nederlandse Organisatie voor toegepast-natuurwetenschappelijk onderzoek TNO, 's-Gravenhage (NL)

(72) Inventors: Joanne Mariska Donkers, Haarlem (NL); Hossein Eslami Amirabadi, Utrecht (NL); Eveline Julia Streekstra, Utrecht (NL); Josse Johan Bernhard Bouwhuis, Utrecht (NL); Frank Henri Johan Schuren, Veenendaal (NL); Michel Ossendrijver, Putten (NL); Evita Van De Steeg, Elspeet (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 702 days.

(21) Appl. No.: 18/025,027

(22) PCT Filed: Sep. 7, 2021

(86) PCT No.: PCT/NL2021/050540

§ 371 (c)(1),
(2) Date: Mar. 7, 2023

(87) PCT Pub. No.: WO2022/055345

PCT Pub. Date: Mar. 17, 2022

(65) Prior Publication Data

US 2023/0330663 A1 Oct. 19, 2023

(30) Foreign Application Priority Data

Sep. 8, 2020 (EP) .................................... 20195103

(51) Int. Cl.
*B01L 3/00* (2006.01)

(52) U.S. Cl.
CPC . *B01L 3/502715* (2013.01); *B01L 2300/0877* (2013.01)

(58) Field of Classification Search
CPC ....... B01L 3/502715; B01L 2300/0877; B01L 1/025; B01L 2300/0627; B01L 2300/088;
(Continued)

(56) References Cited

U.S. PATENT DOCUMENTS

2014/0038279 A1 2/2014 Ingber et al.
2017/0058243 A1 3/2017 Levner et al.

FOREIGN PATENT DOCUMENTS

WO 2016129578 A1 8/2016
WO WO 2017/131839 A2 8/2017
(Continued)

OTHER PUBLICATIONS

European Patent Office, International Search Report in corresponding International Application No. PCT/NL2021/050540, dated Dec. 21, 2021 (4 pages).

*Primary Examiner* — Christine T Mui
(74) *Attorney, Agent, or Firm* — Leydig, Voit & Mayer, Ltd.

(57) ABSTRACT

A system for investigating a membrane including a sealing chamber containing a liquid container is described. The liquid container is configured to hold a liquid medium in open communication with a controlled atmosphere inside the sealing chamber. A flow cell is disposed outside the sealing chamber and includes flow channels separated by the tissue. A set of liquid ducts is connected to one of the flow channels and configured to carry the liquid medium from the liquid container, through a barrier of the sealing chamber to an entrance of the flow channel into the flow cell, and carry at least part of the liquid medium exiting the flow channel from the flow cell back into the liquid container.

17 Claims, 6 Drawing Sheets

(58) Field of Classification Search
CPC ....... B01L 2300/0887; B01L 2300/123; B01L 2400/06; C12M 23/16
USPC .................................................. 422/502, 500
See application file for complete search history.

(56) References Cited

FOREIGN PATENT DOCUMENTS

| | | | |
|---|---|---|---|
| WO | WO 2019/060783 | A1 | 3/2019 |
| WO | WO 2019/195338 | A1 | 10/2019 |
| WO | WO 2020/018950 | A1 | 1/2020 |

CONDITIONING CHAMBER FOR DUAL-INTERFACE FLUIDIC SYSTEM

CROSS-REFERENCE TO RELATED APPLICATIONS

This patent application is a U.S. National Phase of PCT International Application No. PCT/NL2021/050540, filed Sep. 7, 2021, which claims priority to European Application No. 20195103.5, filed Sep. 8, 2020, which are both expressly incorporated by reference in their entireties, including any references contained therein.

TECHNICAL FIELD AND BACKGROUND

The present disclosure relates to a system for investigating a sample membrane, and use of the system.

Microfluidic devices can be used to investigate various types of biological and non-biological membranes such as (epithelial) barriers, (fresh) tissue explants, cell layers, scaffolds, or other membranes. For example, a piece of tissue explant may contain different cell types which can be distinguished from cell mono- or double layers, or a suspension of cells injected into a chip. A barrier placed in a microfluidic chip can also be referred to as a 'barrier-on-a-chip', e.g. 'gut-on-a-chip', 'intestine-on-a-chip', 'lung-on-a-chip', 'skin-on-a-chip', et cetera. For example, a 'barrier-on-a-chip' can enable to study under which conditions and to which extent certain compounds that flow through the first channel (e.g. mimicking the lumen/apical side of the membrane) will pass through the barrier and end up in the second channel (e.g. mimicking the blood/basolateral side of the membrane). In some implementations, it can be desired to simulate specific conditions, e.g. in the gut or lung, by having an anaerobic liquid flow through one channel, while having an aerobic liquid flow through the other channel. In this way, the oxygen content at one side of the epithelial tissue is high, while at the other side it is low.

As background, WO 2017/131839 A2 describes a low-oxygen system directed to culturing a diverse microbiome and including an anaerobic chamber and at least one microfluidic device removably inserted in the anaerobic chamber. The microfluidic device includes a first microchannel in which a first level of oxygen is maintained, and a second microchannel in which a second level of oxygen is maintained, the second level of oxygen having a greater oxygen concentration than the first level of oxygen. The microfluidic device further includes a membrane located at an interface region between the first microchannel and the second microchannel, the membrane further having a plurality of pores via which oxygen flows from the second microchannel to the first microchannel to form an oxygen gradient in the first microchannel. The system further includes a culture system provided in the first microchannel and including oxygen-sensitive anaerobic bacteria.

There remains a need for further improving known systems, e.g. making them more accessible and operable over long periods of time.

SUMMARY

One problem of prior art systems is, that it can be difficult to monitor the system and take high-quality samples over longer periods of time. For example, prior art systems may require a constant anaerobic (nitrogen) gas flow. Also, to avoid degradation of the samples, e.g. by oxygen the entire system needs to be placed in an anaerobic glove box to provide anaerobic sampling. The inventors designed a system, wherein samples can be taken and stored under controlled, e.g. anaerobic, conditions, even if the system is run for longer periods of time without constant resupply of a controlled gas composition.

Some aspects of the present disclosure can be embodied as a system for investigating a membrane, e.g. tissue. The system comprises a conditioning chamber, referred herein also as sealing chamber. The chamber comprises a barrier, e.g. walls and/or lid forming an anaerobic box or other air-tight container. The barrier is configured to (hermetically) seal an inside of the chamber from a surrounding environment. In this way a controlled, e.g. anaerobic, atmosphere inside the chamber can be maintained. A liquid container can be placed inside the chamber, e.g. a beaker or other open vessel disposed in the chamber and allowing free exchange of gasses. The liquid container is thus configured to hold a liquid medium in open communication with the controlled atmosphere inside the chamber. A flow cell, e.g. microfluidic chip, is placed outside the first sealing chamber. The flow cell is typically configured to hold the tissue spanned over an opening between flow channels. In other words, a respective flow through the flow channels is (exclusively) separated by the tissue spanning the opening there between. A first set of liquid ducts, e.g. tubing, is connected to one of flow channels. The ducts are configured to carry the first liquid medium from the first liquid container, through the first barrier, e.g. lid or cover of the box (while maintaining the seal), to an entrance of the first flow channel into the flow cell. Accordingly a first flow of the first liquid medium through the first flow channel along a first side of the tissue can be effected. At least part of the first liquid medium exiting the first flow channel from the flow cell is carried back into the first liquid container, e.g. through the same wall or other wall containing the inside of the first sealing chamber.

By providing the flow cell outside the sealing chamber, the chamber and/or membrane can be easily accessed. By keeping only part of the system in the sealing chamber, the chamber can be relatively small, e.g. allowing easier control if atmosphere therein. Besides the flow cell, also other equipment for measurement and control of the atmosphere can be kept outside the chamber to further improve accessibility of this equipment and reduce size requirements. In this way the chamber can be relatively small compared to a system that needs to contain all components, e.g. a large glove box. For example, the sealing chamber can be formed by a closed box that can maintain its atmosphere without constant flushing. By keeping the liquid container open inside the sealing chamber, this may allow free exchange of gasses, forming the first controlled atmosphere, with gasses, dissolved in the liquid medium. For example, if the controlled atmosphere is anaerobic, this may cause the liquid medium to become or stay similarly anaerobic by releasing any oxygen dissolved therein to the controlled atmosphere. Furthermore, by recirculating the liquid medium back to the container, only a limited supply of medium is needed which can be constantly exchanging with the controlled atmosphere. By also providing sample holders inside the sealing chamber, these can be used to receive and keep samples of the liquid medium under the same controlled atmosphere.

Other or further aspects of the present disclosure can be embodied as methods of using the system. In some embodiments, the use comprises providing a liquid medium in the liquid container inside the chamber; providing a tissue in the flow cell connected via the liquid ducts to recirculate the liquid medium via one of the flow channels of the flow cell;

establishing the controlled atmosphere inside the chamber; waiting to allow gasses in the liquid medium to exchange with the controlled atmosphere; and causing the liquid medium to flow via the liquid ducts through the flow channel. Preferably, the controlled atmosphere is established by connecting an atmospheric controller to a valve of the first sealing chamber. Advantageously, the atmospheric controller can be disconnected after establishing the controlled atmosphere and while flowing the first liquid medium through the flow cell. So a constant refreshing of the atmosphere, e.g. by nitrogen flow, is not needed.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
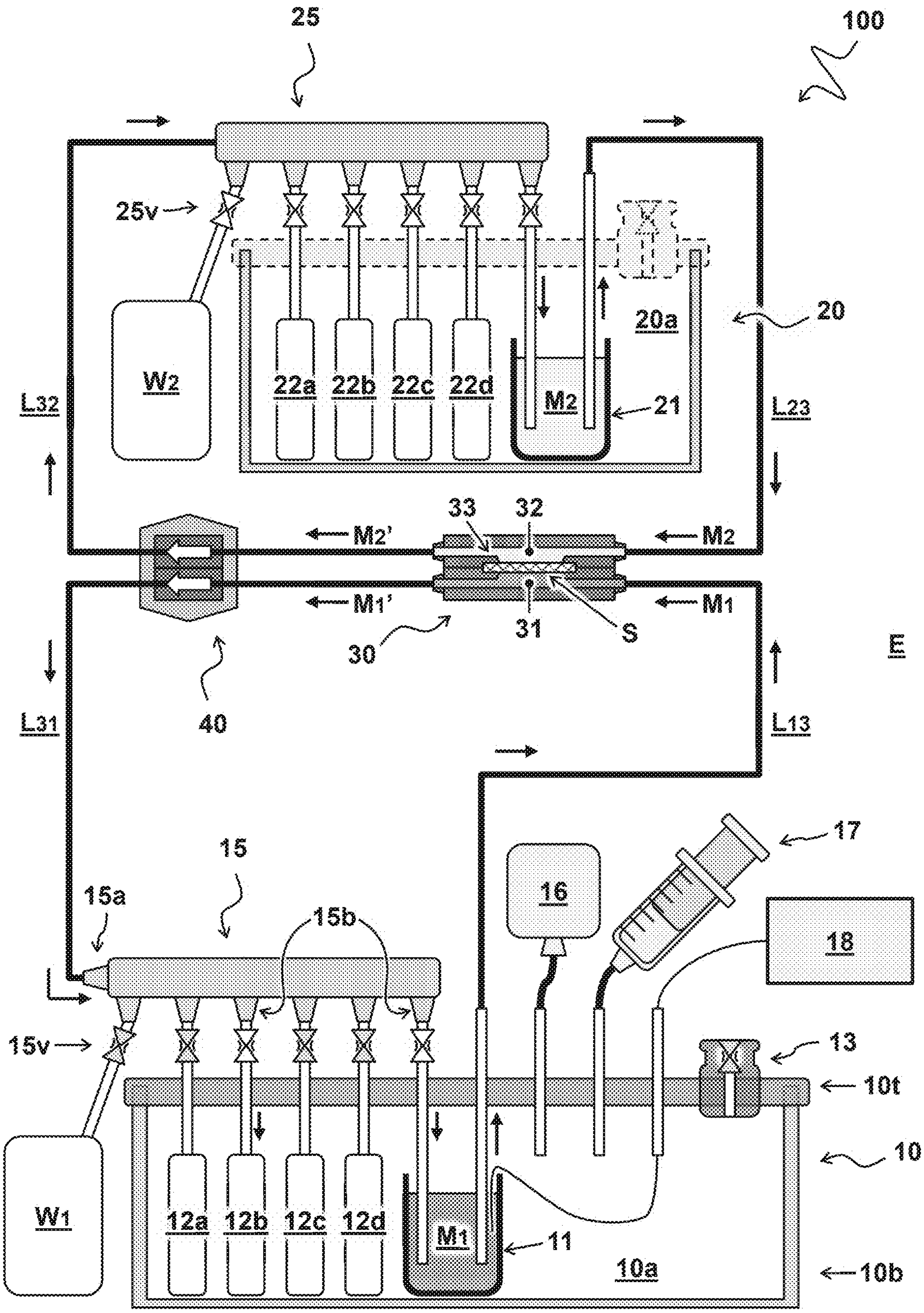
FIG. 1 illustrates a system for investigating a membrane.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

In some embodiments, the present teachings can be used to provide a gas-controlled chamber which allows to create a dual-interface for perfusion systems. This chamber can e.g. be used to recreate physiological circumstances of the gut, which is experiencing low or completely anaerobic levels of oxygen at the luminal, food- and bacteria containing, side and normal levels of oxygen at the blood facing side. However, gas mixture in the gas-controlled chamber can be changed to create various interfaces in any (microfluidic) perfusion system. In some set-ups, the chamber contains anaerobic medium which is connected with tubings to a microfluidic chip. The chip holds an ex vivo intestinal tissue which is facing anaerobic medium (coming from the gas-controlled chamber) at its luminal side, and normal aerobic medium (coming from reservoirs placed in the normal lab environment) at its blood-facing side. With a peristaltic pump, both anaerobic and aerobic medium recirculates through the chip and reservoirs. Using a flow distributor, selector, or other flow controller ("splitter") which can divide the recirculating medium over different collection tubes allows to easily collect samples in the gas-controlled chamber, without having to disconnect and open the system in an anaerobic glove-box to collect samples, or having to collect anaerobic samples in an aerobic environment which will then be in contact with oxygen. The chamber can also have a connection to a pressure sensor and a pressure regulator, e.g. a flexible reservoir such as a balloon or urine bag, to handle pressure differences which can arise for example when placing the gas-controlled chamber from room temperature in a 37 degrees incubator. Through another connections fresh anaerobic air can be infused when needed. Furthermore, oxygen sensors can be integrated or connected to the chamber to monitor the oxygen levels inside the chamber but also inside the medium reservoirs precisely. This oxygen sensor can also be placed anywhere else inside the microfluidic circuit.

Using recirculation instead of one way perfusion can be more cost-effective. There is no need for continuous flushing with nitrogen. Furthermore, as the gas-controlled chamber can be completely closed, any gas mixture can be provided to the chamber with a machine controlling the injection of gas composition. Multiple possibilities can be provided to connect preconditioned fluids inside the gas-controlled chamber to the outside world. There is no need to bring the system to an anaerobic glove box to take samples. For example, the system described herein can provide the possibility to take samples anaerobically in the set-up itself, without bringing it to an anaerobic glove box, or taking samples in an aerobic environment and thus 'contaminate' them with oxygen. The system can also provide controlled monitoring of, e.g., oxygen levels inside the chamber and different compartments of the chamber (e.g. medium reservoirs). The system can also provide ways to sense and regulate pressure differences between the in- and outside of the gas-controlled chamber.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 illustrates a system 100 for investigating a membrane T.

In some embodiments, the system comprises a first sealing chamber 10 comprising a first barrier 10*b*,10*t*, e.g. walls and/or lid forming an anaerobic box or other air-tight container. Preferably, the first sealing chamber 10 is configured to (hermetically) seal an inside of the first sealing chamber 10 from a surrounding environment E. In this way a first controlled atmosphere 10*a* can be maintained inside the first sealing chamber 10.

In some embodiments, a first liquid container 11 is contained inside the first sealing chamber 10, e.g. beaker or other open vessel disposed in the chamber and allowing free exchange of gasses. For example, the first liquid container 11 is configured to hold a first liquid medium M1 in open communication with the first controlled atmosphere 10*a* inside the first sealing chamber 10.

In some embodiments, a flow cell 30, e.g. microfluidic cell, is disposed outside the first sealing chamber 10. Preferably, the flow cell 30 comprises at least a first flow channel 31 and a second flow channel 32. In one embodiment, a clamping structure 34 or other interface is configured to hold the membrane T spanned over an opening between the flow channels 31,32. Accordingly a respective flow through the flow channels 31,32 is separated by the membrane T spanning the opening there between.

In some embodiments, a first set of liquid ducts L13,L31, e.g. tubing, is connected to the first flow channel 31. For example, the liquid ducts are configured to carry the first liquid medium M1 from the first liquid container 11, through the first barrier 10*b*,10*t* (while maintaining the seal), e.g. lid or cover of the box, to an entrance of the first flow channel 31 into the flow cell 30. In this way the ducts can facilitate a first flow of the first liquid medium M1 through the first flow channel 31 along a first side of the membrane T. In a preferred embodiment, the liquid ducts are configured to carry at least part of the first liquid medium M1' exiting the first flow channel 31 from the flow cell 30 back into the first liquid container 11, e.g. through the same wall 10*t* or other wall containing the inside of the first sealing chamber 10.

In some embodiments, the system comprises a second liquid container 21 configured to hold a second liquid medium M2. Typically the second liquid medium M2 has a different composition than the first liquid medium M1. For example, the second liquid medium M2 has different (amounts of) solutes, e.g. oxygen or other constituents such as nutrients, medicine, et cetera. Optionally, the medium itself can also be different, e.g. formed by a different solvent.

In some embodiments, a second set of liquid ducts L23, L32 is connected to the second flow channel 32 and configured to carry a second liquid medium M2 from the second liquid container 12 to an entrance of the second flow channel 33 into the flow cell 30 for causing a second flow of the second liquid medium M2 through the second flow channel 32 along a second side of the membrane T. Preferably, the second set of liquid ducts L23,L32 is further configured to carry at least part of the second liquid medium M2' exiting the second flow channel 32 from the flow cell 30 back into the second liquid container 21. In other words, at least part of the second liquid medium can also be recirculated. Alternatively, some or all of the first and/or second liquid medium can be discarded after traversing the flow cell 30.

In one embodiment, e.g. as shown, a first flow path through the first set of liquid ducts L13,L31 from the first liquid container 11 through the first flow channel 31 back to the first liquid container 11 has a first path length; and a second flow path through the second set of liquid ducts L23,L32 from the second liquid container 21 through the second flow channel 32 back to the second liquid container 21 has a second path length. In a preferred embodiment, the first and second path lengths are essentially the same, e.g. within ten percent, preferably within five percent, or even less, i.e. virtually identical (within measurement tolerance). By providing similar path lengths (and similar or the same liquid ducts), the flows can be similar on both sides of the tissue. This may prevent e.g. pressure or other differences between the flows which could affect the tissue measurements.

In some embodiments, the system comprises or is coupled to a pump 40 arranged in a path of the first and/or second set of liquid ducts. For example, the pump 40 is configured to control a respective flow though the respective flow channels 31,32 of the flow cell 30. Typical flows may e.g. be set between one and hundred milliliter per hour. Also other flow rates can be used depending e.g. on the flow cell 30 and sample under study. In some embodiments, the same pump is used to control a respective flow in both sets of liquid ducts. Also separate pumps can be used. For example, the one or more pumps can be used to set the same or different flow rates in the respective channels 31,32. In some embodiments, e.g. as shown, the pump 40 is disposed along a respective liquid duct L31,L32 in a flow path after the respective exit of the flow cell 30 leading back to the respective liquid container 11,12. For example, the pump is disposed between the flow cell 30 and a flow distributor 15,25 (discussed in further detail below). Alternatively, the pump can also be disposed elsewhere, e.g. at a respective liquid duct L13,L23 in a flow path before the flow cell. Preferably, the pump is a peristaltic pump also known as a roller pump. For example, the fluid is contained within a flexible tube forming at least part of the respective liquid duct. The flexible tube can be fitted inside a pump casing. In a circular pump casing, a rotor with a number of "rollers", "shoes", "wipers", or "lobes" attached to the external circumference of the rotor can be used to compress the flexible tube. As the rotor turns, the part of the tube under compression is pinched closed thus forcing the fluid to be pumped to move through the tube. Additionally, as the tube opens to its natural state after the passing of the cam fluid flow is induced to the pump. Typically, there will be two or more rollers, or wipers, occluding the tube, trapping between them a body of fluid. Also linear peristaltic pumps can be used.

In some embodiments, the system comprises a second sealing chamber 20. For example, the second sealing chamber 20 comprises a second barrier configured to seal an inside of the second sealing chamber 20 from the surrounding environment E. Accordingly a second controlled atmosphere 20*a* can be maintained inside the second sealing chamber 20. In other or further embodiments, the second liquid container 21 is contained inside the second sealing chamber 20. For example, the second liquid container 21 is configured to hold the second liquid medium M2 in open communication with the second controlled atmosphere 20*a* inside the second sealing chamber 20. In other words, the system may comprise multiple sealing chambers which can be similar or identical. For example, each channel 31,32 of the flow cell 30 can be connected to a respective sealing chamber 10,20 with a respective liquid container 11,21 containing a respective liquid medium M1,M2 exchanging with a respective controlled atmosphere 10*a*,20*a*. Typically, the atmosphere in each chamber is controlled to have a different atmosphere. For example, the first controlled atmosphere has relatively low oxygen contents anaerobic, while the second controlled atmosphere can be relatively high or normal oxygen contents aerobic.

Alternatively to sealing the second liquid container 21 in a respective sealing chamber 20, the second liquid container 21 or at least the sealing thereof can be omitted. For example, the second liquid container 21 can be kept in open communication with the surrounding environment E. For example, if the surrounding environment E is aerobic this may cause the second liquid medium M2 to be similarly aerobic by exchanging oxygen of the environment with the second liquid medium M2. It can also be envisaged to a closed sealed container to hold the second liquid medium M2 with or without recirculating flow. Alternatively, or in addition, it can also be envisaged that the second liquid container 21 is contained in the same first sealing chamber 10 as the first liquid container 11. For example, both the first liquid medium M1 and second liquid medium M2 can be exposed to the same first controlled atmosphere 10*a*. For example, both liquids M1,M2 are kept under the same atmospheric conditions while their e.g. non-gaseous contents may differ in some other way which can independent of these conditions.

In some embodiments, the system comprises a first flow distributor 15 or divider/splitter connected to the first set of liquid ducts L13,L31 between the first flow channel 31 and the first sealing chamber 10. Preferably, the first flow distributor 15 is configured to selectively and/or controllably direct an incoming flow of first liquid medium M1', at an entry port 15*a* of the first flow distributor 15, to one or more exit flows at respective exit ports 15*b* of the first flow distributor 15. In a preferred embodiment, at least one of the exit ports 15*b* is connected to a liquid duct through the first barrier 10*b*,10*t* for directing at least part of the first liquid medium M1' back into the first liquid container 11. For example, the respective exit ports are provided with one or more controllable valves 15*v* to open or close a respective exit flow. For example, the valves can be formed by releasable clamps on tubing forming the ducts into the container. Also other types of valves can be envisaged.

In some embodiments, the first sealing chamber 10 contains one or more sample containers 12 configured to receive and hold a liquid sample of the first liquid medium M1 (separate from the first liquid container 11). For example, at least one of the exit ports 15*b* of the first flow distributor 15 is connected to a liquid duct through the first barrier 10*b*, 10*t* for (selectively) directing at least part of the first liquid medium M1' into a respective sample container of the one or more sample containers 12. For example, the respective valves 15*v* at the exits 15*b* of the first flow distributor 15 can be operated to control the flow into the first liquid container 11 and/or into one or more of the sample containers 12. Advantageously the sample containers 12 can be held in the first controlled atmosphere 10*a* which can e.g. prevent degradation of the respective samples taken from the flow of first liquid medium M1 which has traversed the first flow channel 31. By providing multiple sample containers 12*a*-12*d* inside the first sealing chamber 10 different samples of the first liquid medium M1 can be taken, e.g. at different times. In a similar way, also the second liquid medium M2 can be sampled. For example, a second flow distributor 25 is connected to the second set of liquid ducts L23,L32 and configured to selectively direct a flow of the second liquid medium M2 into the second liquid container 21 and/or into one or more sample containers 22 (e.g., sample containers 22*a*-22*d*). The sample containers 22 can optionally be sealed together with the second liquid container 21 inside the second sealing chamber 20, or simply kept in the surrounding environment E depending on desired conditions.

It will be understood that any duct through the barrier of a respective sealing chamber is configured to prevent exchange of gasses in the controlled atmosphere (contained in the chamber by the barrier) with the surrounding environment E. In other words the respective ducts form an air-tight connection with the respective barrier of the sealing chamber. For example, the liquid ducts are configured to exclusively allow the liquid medium inside the duct through the barrier while preventing the surrounding environment E leaking in. Also other sealed ducts can be used as described in the following.

In some embodiments, the system comprises a pressure control system 16 configured to maintain a controlled pressure of the first controlled atmosphere 10*a* inside the first sealing chamber 10. Preferably, the pressure control system 16 is configured to maintain the same pressure inside the first sealing chamber 10 as the surrounding environment E. For example, the first controlled atmosphere 10*a* inside the first sealing chamber 10 is kept at the same or similar pressure (e.g. measured in bar or Pascal) as the surrounding environment E of the first sealing chamber 10, e.g. within ±5% of the outside atmospheric pressure, preferably within ±2%, more preferably 15 within ±1%, or less. This may alleviate the outside atmosphere leaking into the chamber, or vice versa; and also alleviate, e.g., uneven pressure on the sample membrane. The pressure control system can be relatively simple, e.g. comprising a flexible barrier surface (preferably having minimal resilience) that can relay pressure from the environment to inside the container without exchanging gasses. For example, a flexible bag can be connected via a duct with the controlled atmosphere 10*a* inside of the sealing chamber 10. Alternatively, it can also be envisaged that a wall of the first sealing chamber is formed by a flexible sheet that can freely move to compensate any pressure differential but is but impenetrable to gasses for maintaining the controlled atmosphere 10*a*.

In some embodiments, the system comprises an atmospheric control valve 13 through the first barrier 10*b*,10*t* and configured to (detachably) connect an atmospheric controller (not shown) to the first sealing chamber 10 for establishing the first controlled atmosphere 10*a* inside the first sealing chamber 10. For example, the atmospheric control valve 13 comprises a snap shut connection or a screw connection to detachably connect the atmospheric controller.

In one embodiment, upon connecting the atmospheric controller to the atmospheric control valve 13, the atmospheric control valve 13 is configured to open an exchange duct through the first barrier 10*b*,10*t* for initially establishing the first controlled atmosphere 10*a* by the atmospheric controller. In another or further embodiment, upon disconnecting the atmospheric controller from the atmospheric control valve 13, the atmospheric control valve 13 is configured to close the exchange duct for maintaining the first controlled atmosphere 10*a* in the absence of the atmospheric controller.

In some embodiments, the system comprises the atmospheric controller configured to establish and/or maintain the first controlled atmosphere 10*a* inside the first sealing chamber 10. An example of such atmospheric controller is marketed as "Anoxomat® III" which can be purchased from "Advanced Instruments". For example, the controller can be used to supply a gas mixture and make the sealing chamber. For example, an "A-box" (purchasable from "Kentron Microbiology") can be used with snap-shot coupling to connect an atmospheric controller. The inventors have adapted the box to serve the current purposes of the sealing chamber, e.g. by designing an adapted lid with air tight holes to fit the tubings of the liquid/gas ducts, sensor fibers, et cetera. For example, the chamber can be adapted having multiple fittings to fit (standard) high pressure connections through the wall (lid) of the chamber. In some embodiments, the second sealing chamber 20 can be connected to a similar or other atmospheric controller to establish the same or different controlled atmosphere 20*a*. Alternatively, the second sealing chamber 20 can be kept in open communication with the surrounding environment E, or omitted entirely.

In principle, the first sealing chamber 10 can be sufficiently sealed to maintain the atmosphere after disconnecting the controller. If necessary, the atmosphere can be replenished by the same controller or other means. In some embodiments, the system comprises an atmospheric (re) supply unit 17 configured to supply and/or replenish the first controlled atmosphere 10*a* inside the first sealing chamber 10. For example, the atmospheric supply unit 17 may contain a supply of the controlled atmosphere 10*a* which can be fed into the first sealing chamber 10. The atmospheric supply unit 17 can be advantageously combined with the pressure control system 16, so that the supply of extra gas preferably does not alter the pressure inside the first sealing chamber 10.

In some embodiments, the system is configured to connect with one or more sensors, e.g. to measure pressure and/or oxygen, report the read-out thereof, optionally for feedback and control, e.g. coupled to one or more reservoirs. For example, the system comprises a sensor 18 configured to measure the first liquid medium M1, e.g., in the first liquid container 11. For example, the sensor is configured to measure a concentration of oxygen and/or other substance in the first liquid medium M1. Advantageously, this can be combined with the atmospheric supply unit 17, e.g. causing supply of extra gasses into the first sealing chamber 10 responsive to the measuring. For example, if it is measured that the oxygen contents of the first liquid medium M1 is too high, the atmospheric supply unit 17 can be used to supply nitrogen (without oxygen) into the sealing chamber 10. Also other or further sensors can be provided in a similar way. For example, a pressure sensor can be provided with a pressure sensing element held in the first controlled atmosphere 10*a*. Advantageously, the bulk of the sensor can be disposed outside the sealing chamber 10, e.g. providing only a measurement fiber or other wire through the barrier 10*b*,10*t* (while maintaining the sealing of the controlled atmosphere 10*a*).

Also other or further means can be provided to maintain a controlled atmosphere inside the sealing chamber. For example, an oxygen binding or absorbing material can be provided in the chamber to establish and/or maintain an anaerobic atmosphere. As will be appreciated, such means can be particularly effective if the volume of the chamber is relatively small.

In a preferred embodiment, the first sealing chamber 10 has a capacity (maximum interior volume) of less than hundred liters, less than fifty liters, less than twenty liters, less than ten liters, or even less than five liters. The smaller the chamber interior volume, the easier it may be to establish and/or maintain a controlled atmosphere. It will be noted that part or even most of the interior volume in the chamber can be taken up by the liquid container with the liquid medium and/or sample holders. So the actual atmospheric volume to be controlled of can be even less. For example, the chamber has a maximum interior dimension of less than fifty centimeters, less than thirty centimeters, or even less than twenty centimeters.

In some embodiments, the system comprises a first waste container W1 connected to a respective exit port 15*b* of the first flow distributor 15 and configured to selectively receive at least part of the first liquid medium M1'. Preferably, the first waste container W1 is disposed outside the first sealing chamber 10. For example, the waste container can be used to catch an initial or other flow of the first liquid medium M1 that does not need to be recirculated and can be discarded. For example, the initial flow may contain oxygen or contaminants that may be initially present in the first flow channel 31 and/or first set of liquid ducts L13,L31. Accordingly, the first waste container W1 is preferably not kept inside the first sealing chamber 10 where it could otherwise pollute the first controlled atmosphere 10*a* and/or take up unnecessary space. In a similar way, also the second flow distributor 25 can be connected to a second waste container W2 which can be kept in the surrounding environment E.

Optionally, the same waste container can be used for both flows. A valve 25*v* can be operated to control the flow to the second waste container W2.

In some embodiments, the system 100 as described herein can be used as follows. A first liquid medium M1 is provided in the first liquid container 11 inside the first sealing chamber 10. A membrane T is provided in the flow cell 30 connected via the first set of liquid ducts L13,L31 to recirculate the first liquid medium M1 via the first flow channel 31 of the flow cell. The first controlled atmosphere 10*a* inside the first sealing chamber 10 is established, and there can be a waiting time to allow gasses in the first liquid medium M1 to exchange with the first controlled atmosphere 10*a*. After this, the first liquid medium M1 can be caused to flow via the first set of liquid ducts L13,L31 through the first flow channel 31 of the flow cell 30. Preferably, the first controlled atmosphere 10*a* is established by connecting an atmospheric controller to an atmospheric control valve 13 of the first sealing chamber 10. For example, the atmospheric controller is disconnected after establishing the first controlled atmosphere 10*a* and while flowing the first liquid medium M1 through the flow cell 30. In some embodiments, the first controlled atmosphere 10*a* is anaerobic, e.g. with an oxygen concentration less than one percent, preferably less than half of a percent, or even less than a tenth of a percent, e.g. 0.05%. In one embodiment, while flowing the first liquid medium M1 through the flow cell 30, a concentration of oxygen in the first liquid medium M1 is measured. For example, upon measuring the concentration of oxygen is higher than a predetermined threshold, a further supply of anaerobic air is injected into the first sealing chamber 10. Also other uses of the system can be envisaged.

The system as described herein can be used e.g. for measuring, testing, and/or analyzing permeability of substances through a membrane. For example, the membrane comprises (epithelial) barrier, (fresh) tissue explant, cell layers, scaffold, or other membranes. For example, a piece of tissue explant may contain different cell types which can be distinguished from cell mono- or double layers, or a suspension of cells injected into a chip. In use, the membrane is placed in a cavity opening between flow channels 31,32. For example, the substances can be disposed in at least one of the fluid flows, e.g. in different amounts. In some embodiments, a respective content of the substances in the first and/or second reservoir flow is measured and/or monitored to determine an exchange of the substances through the membrane. For example, the substances may include nutritional components, medicine, et cetera. For example, the membrane comprises a tissue sample, scaffold e.g. 3D structure with cells, or other membrane, e.g. plastic or polyester.

Figure 2A:
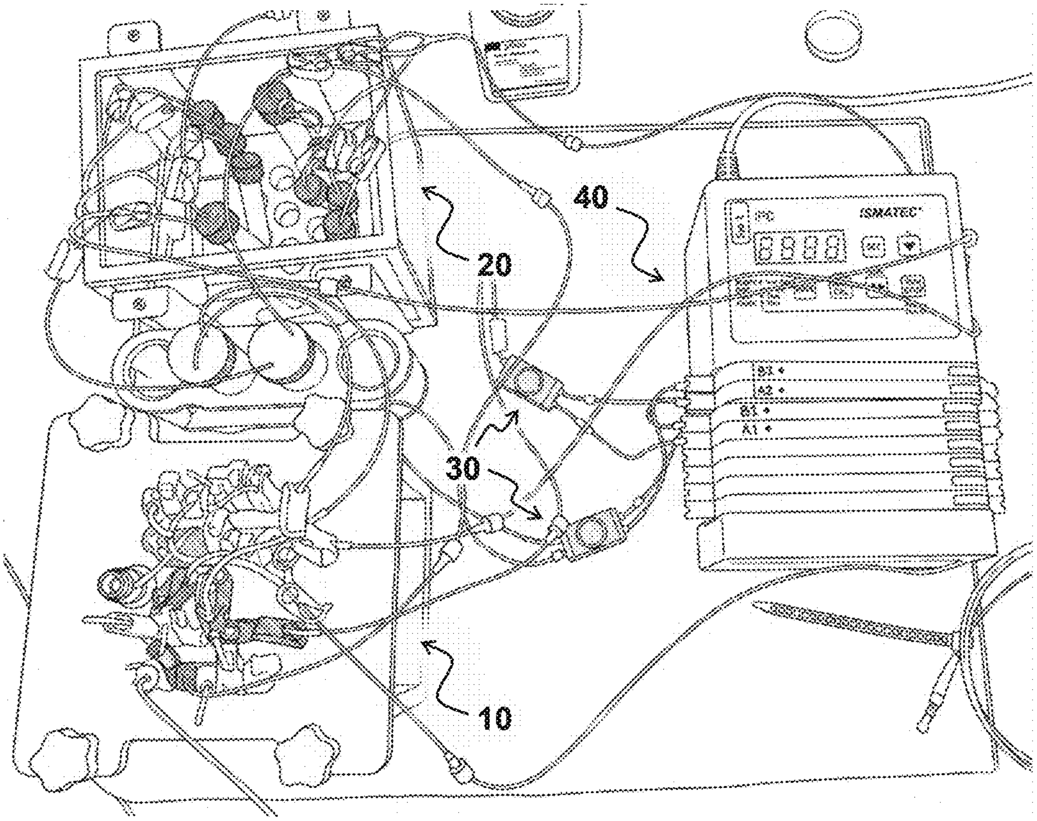
FIGS. 2A and 2B illustrates photographs of a prototype setup of the system.
Figure 2B:
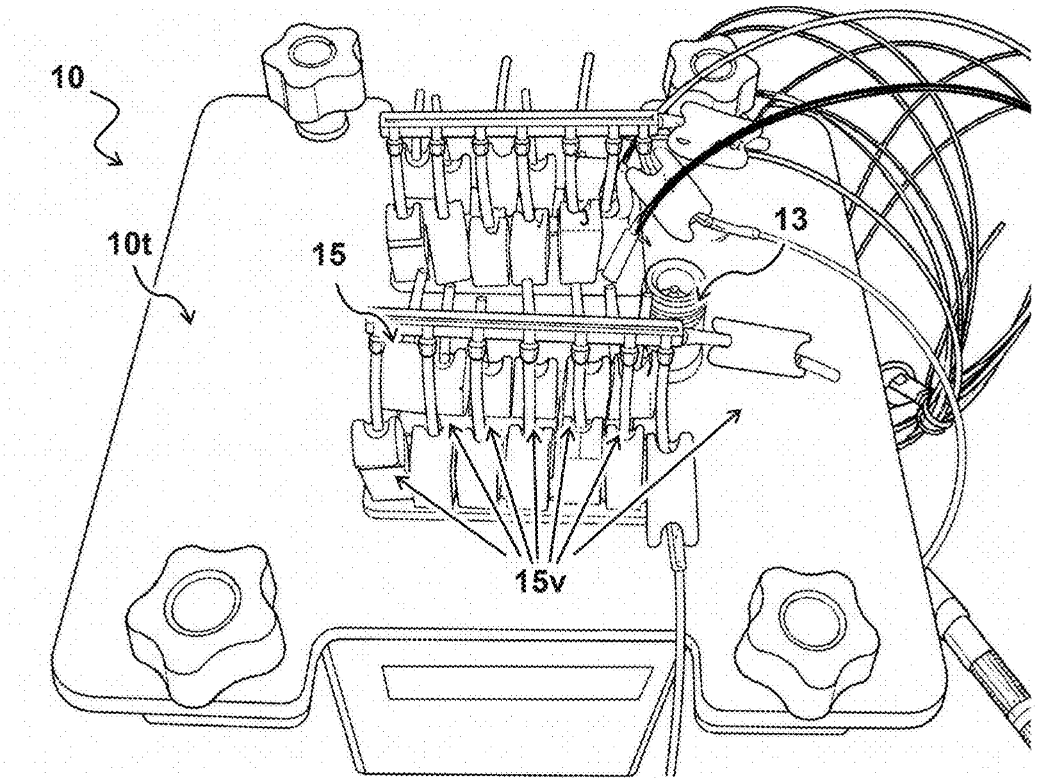

FIGS. 2A and 2B illustrates photographs of a prototype setup of the system as described herein. FIG. 2A illustrates a first chamber 10 that is sealed, and a second chamber 20 that is open. In this case two flow cells 30 containing ex vivo intestinal tissue are connected via respective tubing and a peristaltic pump 40. FIG. 2B illustrates further detail of the first chamber 10 which includes a lid 10*t* sealingly connected to the box underneath. Besides the gas valve 13, the lid has several sealed openings for allowing ducts and fibers there through. For example, the flow distributor 15 as shown is connected to a number of sample containers inside the chamber 10. A respective flow to one of the sample holders can be selected by opening a respective one of the fluid valves 15*v*.

Figure 3A:
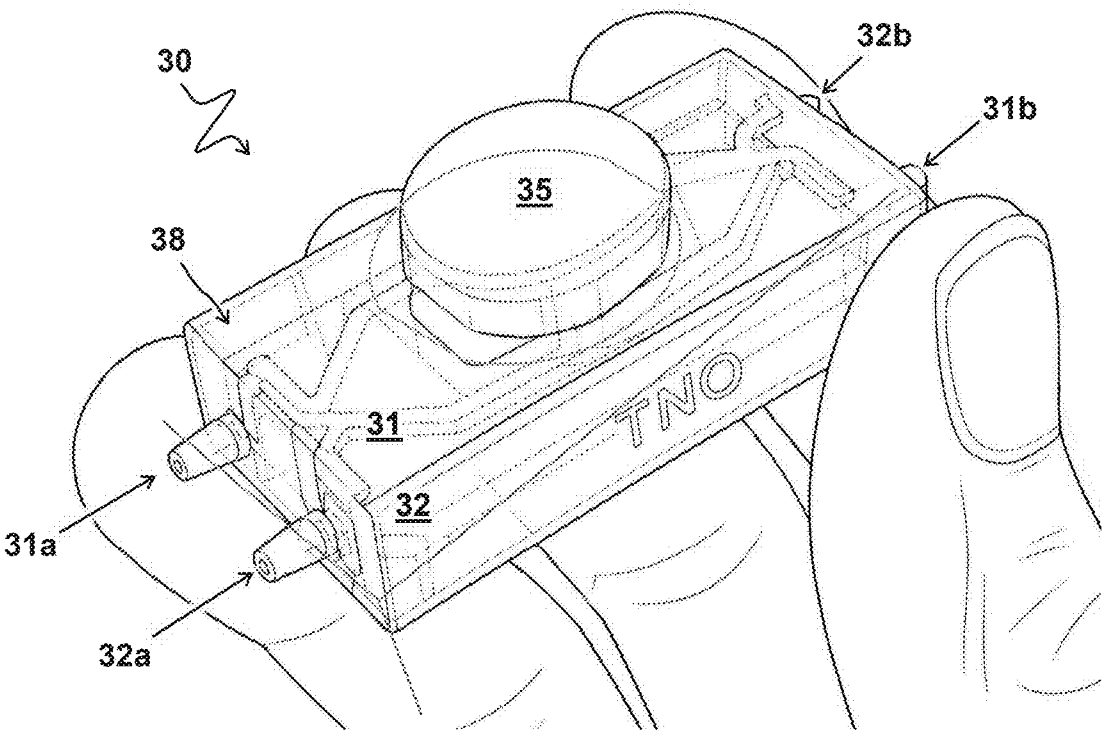
FIGS. 3A and 3B illustrate a preferred flow cell for placing the tissue.

FIG. 3A illustrates a perspective view of a flow cell 30 (microfluidic device) closed by a cap 35. In one embodiment, e.g. as shown, the flow cell 30 has a housing forming at least two flow channels 31,32. Also three or more channels can be envisaged (not shown). In the embodiment shown, the flow cell 30 is translucent, so the channels 31,32 through the housing 38 are visible, as well as possible content of the channels. This may allow to easily view a flow inside the housing without opening the cap. Also other, e.g. opaque, materials can be used. Preferably, the housing 38 comprises, e.g. essentially consists of, a material such as plastic. In a preferred embodiment, e.g. as shown here, the device is manufactured by 3D printing. For example, the device is made of a printable (cured) material. Also other manufacturing methods and materials can be envisaged.

In one aspect, the present disclosure provides a flow cell 30 for analyzing permeability of substances through a (sample) membrane T, e.g. tissue. For example, the substances are disposed in a respective fluid flow. Typically, the flow cell 30 comprises a housing 38 with flow channels 31,32. In some embodiments, a first flow channel 31 is configured to pass a first fluid flow through the housing 38 between a first input connector 31*a* and a first output connector 31*b*. In other or further embodiments, a second flow channel 12 is configured to pass a second fluid flow through the housing 38 between a second input connector 32*a* and a second output connector 32*b*.

In a preferred embodiment, the device comprises an access cavity extending from outside into the housing 38 through the first flow channel 11 and into the second flow channel 12. Accordingly, the cavity can be used for accessing an inside of the housing 38 to place the membrane T over a cavity opening 33. Most preferably, the cavity opening 33 forms an (exclusive) fluid interconnection between overlapping areas of the flow channels 31,32. In a preferred embodiment, the access cavity can be opened and/or closed off by a cap 35. Most preferably, the cap 35 can be reversibly removed to access the cavity and, e.g., place or replace the membrane T. For example, the cap 35 and/or housing comprises a resilient material such as rubber there between the seal the cap to the housing. Also other resilient structures can be used, or the cap can be screwed to the housing.

Figure 3B:
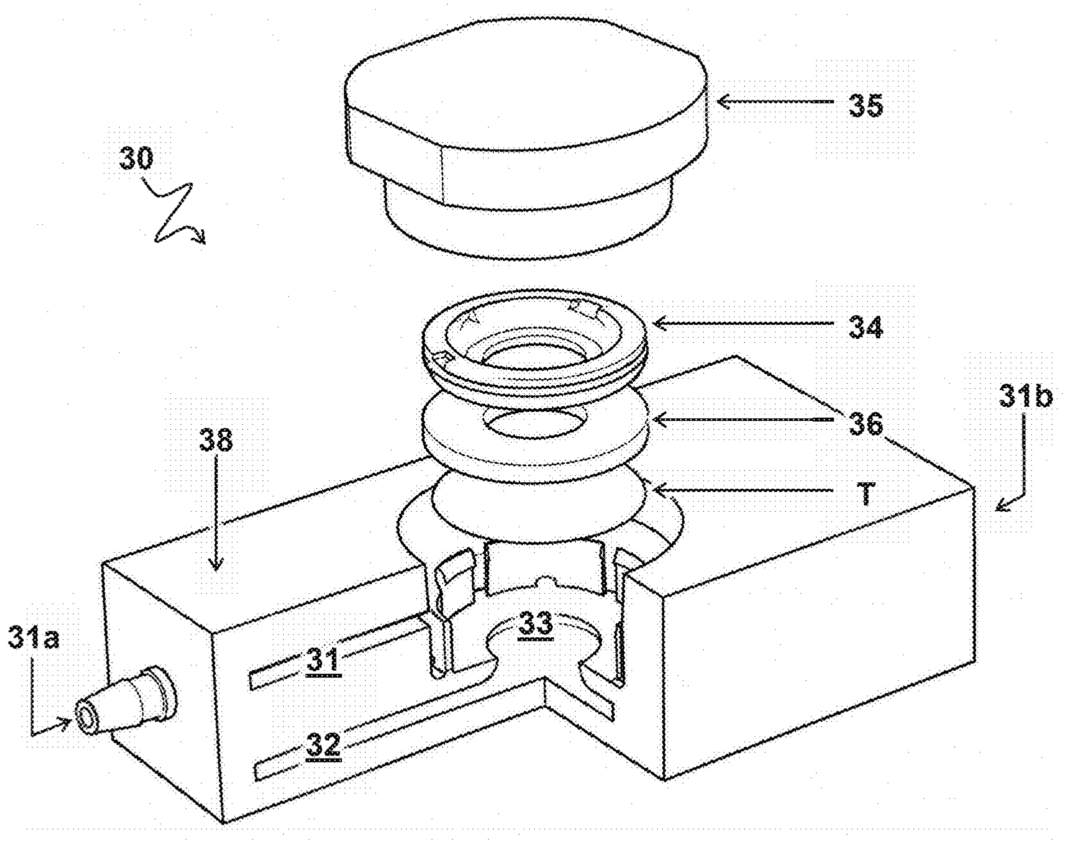

FIG. 3B illustrates a cutout/exploded view of the flow cell 30 with various components. In a preferred embodiment, the flow cell 30 comprises a clamping ring 34. In one embodiment, e.g. as shown, the clamping ring 34 comprises a connection structure. For example, the connection structure is configured to engage a corresponding connection structure of the housing inside the access cavity. Accordingly, the clamping ring 34 can be used for holding the sample membrane T in place over the cavity opening 33. Typically, the membrane T is, in use, exposed to the respective fluid flows through the flow channels 31,32 on either sides of the membrane T. While in a preferred embodiment, the openings are circular, also other shapes can be envisaged. Typically, the sealing ring 36 is configured to (in use) contact the membrane T.

In one embodiment, the housing 38 extends with a cavity seat forming a platform around the cavity opening 33 between the overlapping areas of the flow channels 31,32 to directly or indirectly hold the membrane T between the cavity seat and the clamping ring 34. For example, the membrane T can be placed directly on the cavity seat. For example, the clamping ring 34 may directly clamp down on the membrane T. Preferably though a sealing ring 36 is disposed on either one or both sides of the membrane T. In one embodiment, e.g. as shown, at least one sealing ring 36 is, in use, disposed between the membrane T and the clamping ring 34. This may improve sealing and/or prevent the clamping ring to damage (e.g. cut into) the membrane T. Also other or further structures can be disposed between the clamping ring 34 and the membrane T and/or between the membrane T and the cavity seat. For example, a mesh can be provided to help further support the membrane T. In some embodiments, e.g. as shown, the membrane T is disposed between the sealing ring 36 and the cavity seat. Also other or further configurations can be envisaged. In one embodiment, the cavity opening 33 on one side of the membrane T and a ring opening through the clamping ring 34 on another side of the membrane T are configured to, in use, expose the membrane T to the respective fluid flows in the flow channels 31,32.

Figure 4A:
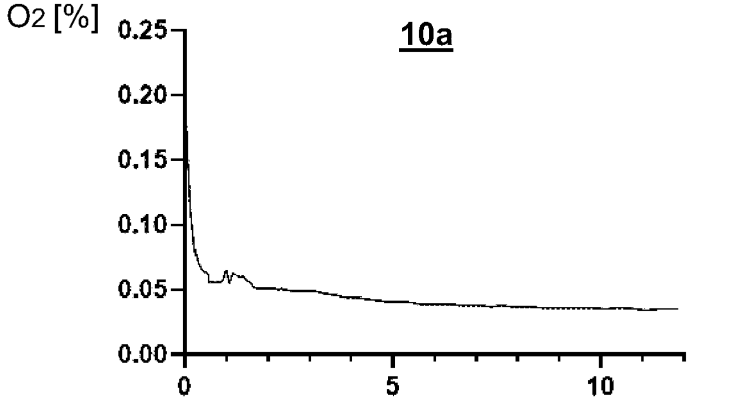
FIGS. 4A-6B illustrate various measurements.
Figure 4B:
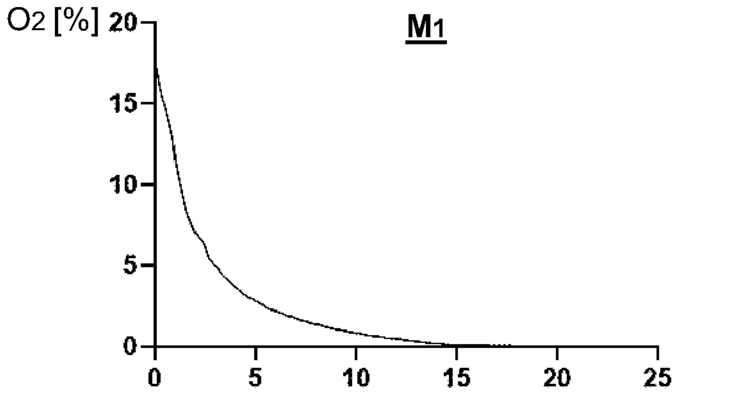
Figure 4C:
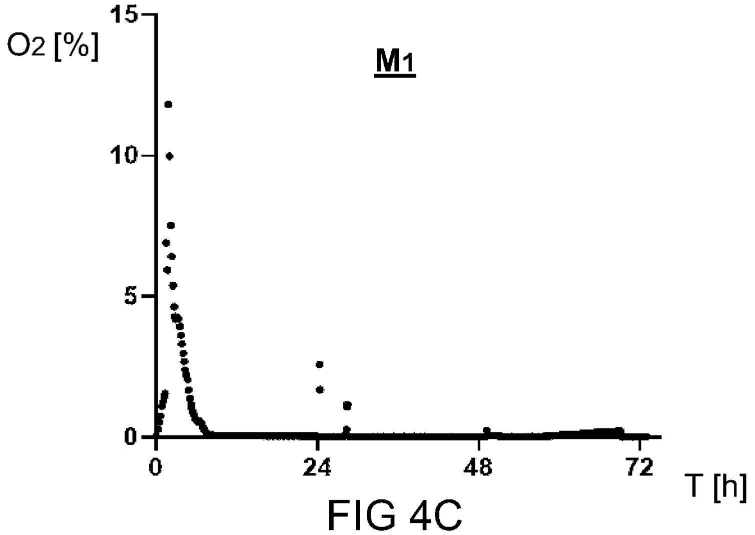

FIGS. 4A-4C illustrate oxygen concentration ($O_2$%) as a function of time (T in hours [h]). FIG. 4A illustrates the oxygen concentration in the air forming an atmosphere 10*a* of a sealing chamber; FIG. 4B illustrates oxygen concentration in the liquid medium M1 contained in the chamber. After an “Anoxomat” procedure to make the gas-controlled chamber anaerobic, the air has an oxygen concentration <0.20% which drops further quickly (e.g. with the help of catalyst in chamber that catches oxygen). After the procedure the medium M1 is still rich in oxygen, which quickly drops in the next 12 hours to levels below 0.20%. Oxygen rich air in the medium diffuses with anaerobic air in the chamber.

FIG. 4C illustrates oxygen percentage measured in anaerobic medium inside the anaerobic system during a control experiment with tubing and an empty chip. Twenty-four hours after the gas-controlled chamber and medium inside the chamber was made anaerobic, it was connected to tubing, a microfluidic chip (without intestinal tissue), and a peristaltic pump. The system was run with 2 ml/hr for 72 hours. Except for a small rise in oxygen levels in the beginning due to attraction of air from the splitter (presumably, a consequence of under pressure in the box and not tight enough connections of tubing in the splitter, this was improved later) the anaerobic medium in the chamber remained anaerobic for 72 hours.

After these so-called ‘dry’ experiments (without intestinal tissue or other biological materials connected to the system), also experiments have been conducted with intestinal tissue mounted in the microfluidic chip. From these initial experiments it was observed that the system can be sensitive to pressure differences between the in- and outside of the chamber. For example, pressure differences between the gas-controlled chamber and the atmospheric pressure may cause problems in the microfluidic chip (tissue damage reflected by leakage of a big fluorescent molecule through the tissue and crossflow of apical to basolateral medium and vice versa). Therefore, it is preferred to use means for sensing and/or regulating pressure.

Figure 5A:
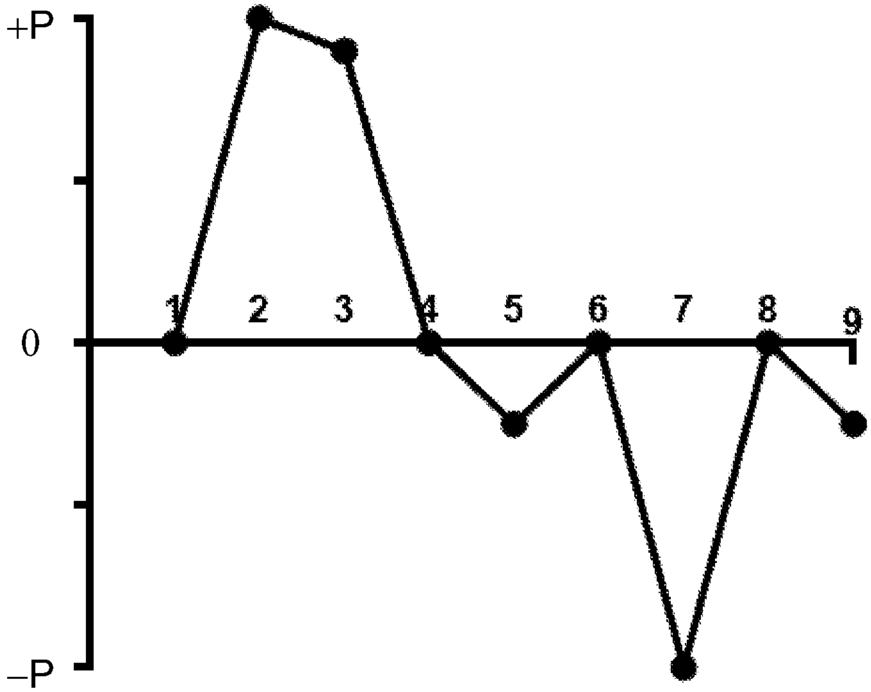
Figure 5B:
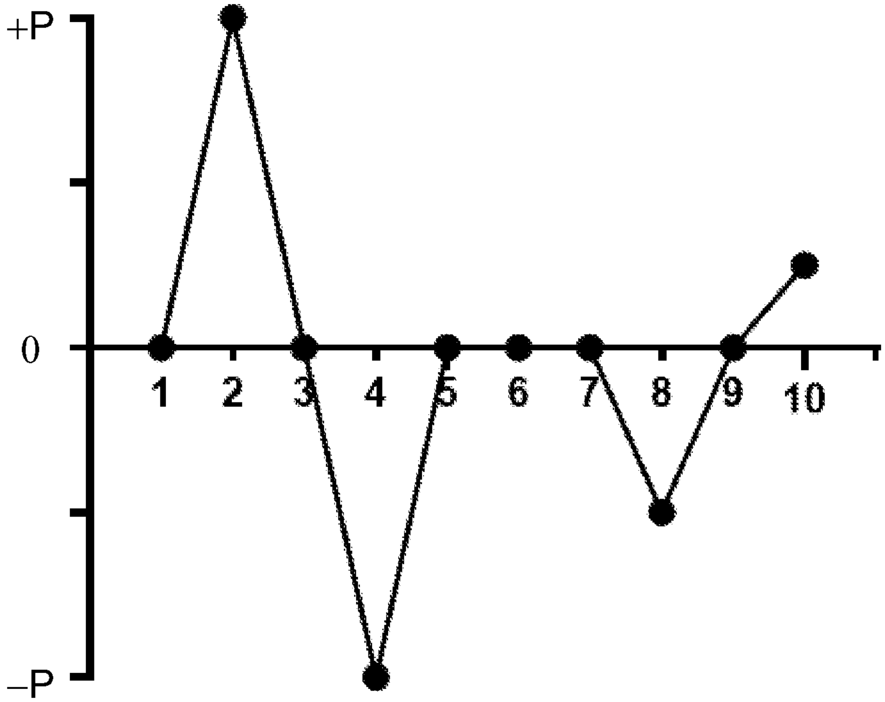

FIGS. 5A and 5B illustrate pressure differences observed inside the system compared to atmospheric pressure in two different experiments. FIG. 5A illustrates differences measured with yse of a hydrostatic physics test in cm. FIG. 5B illustrates differences measured with use of an external reservoir. While the chamber had atmospheric pressure after the Anoxomat procedure, pressure increased when it was placed in an incubator at 37 degrees, but also dropped again later, e.g. due to the catalysts consuming last bits of oxygen. Flush out of medium or keeping the system at room temperature for a while caused underpressure. By the flexible air reservoir and by injecting air, e.g. via a syringe, pressure differences could be regulated. It was observed that starting medium recirculation and sampling in the chamber by making use of the different splitter outlets did not cause further pressure differences (points 5, 6, 7 in FIG. 5B).

Figure 6A:
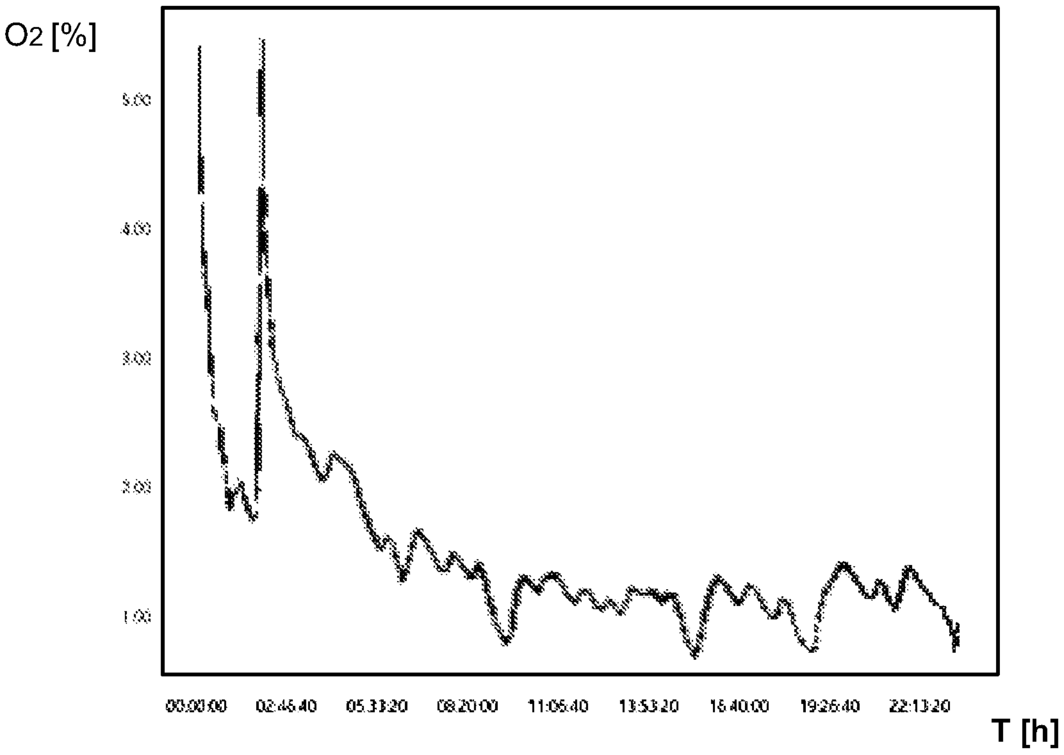
Figure 6B:
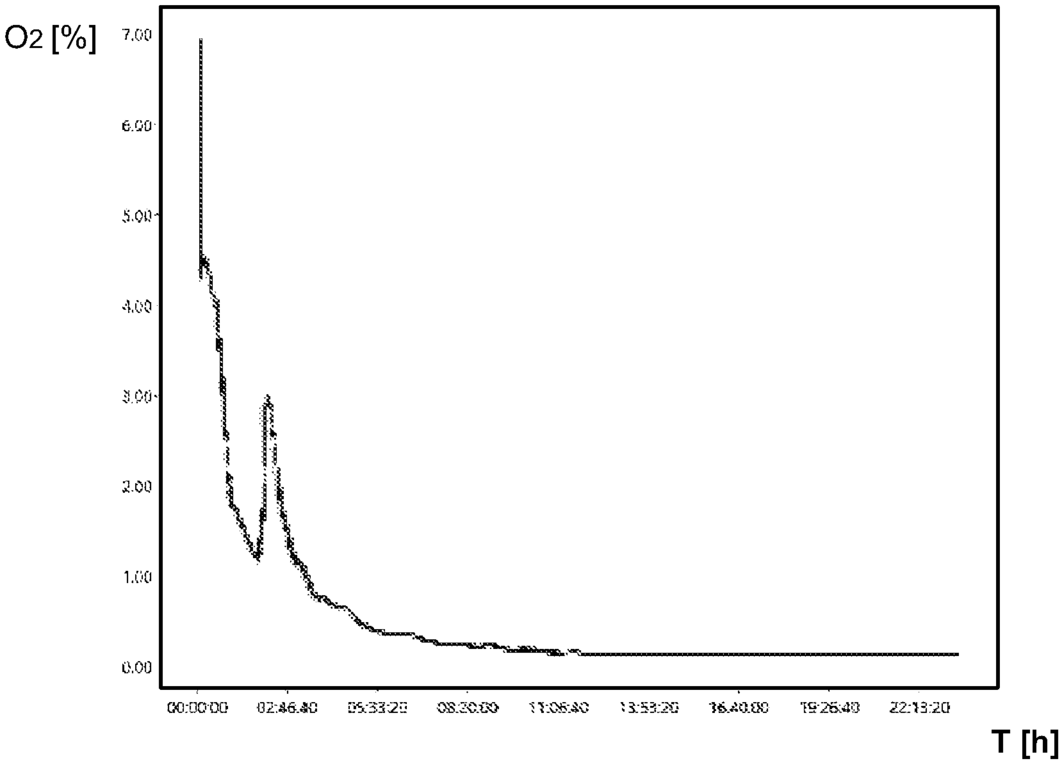

One purpose of this proto-type system is being able to expose intestinal membrane to strictly anaerobic bacteria that live in the gut and study host-microbe interactions. As those bacteria only survive under strict anaerobic circumstances (some die already at oxygen levels >0.5%) experiments were conducted to assess if an anaerobic bacterial strain could survive in our system (no intestinal tissue, medium with bacteria running through the tubings at 2 ml/hr). Two different culture media were tested, Williams E and SIEM. Bacteria cultured in the SIEM medium survived and showed growth during 24 hours, while bacteria cultured in Williams E died (Table 1). Oxygen levels remained low in both Williams E and SIEM as illustrated in FIGS. 6A and 6B.

TABLE 1

Bacteria count at the start and end of incubation, in Williams E or SIEM medium, in the anaerobic system, running without intestinal tissue and at 2 ml/hr.

| Timepoint | William's E | SIEM |
|---|---|---|
| 0 h | $1.0 \times 10^5$ | $3.5 \times 10^5$ |
| 24 h | <10 | $3.2 \times 10^7$ |

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A system for investigating a membrane, the system comprising:

a first sealing chamber comprising a first barrier configured to seal an inside of the first sealing chamber from a surrounding environment for maintaining a first controlled atmosphere inside the first sealing chamber;

a first liquid container contained inside the first sealing chamber, wherein the first liquid container is configured to hold a first liquid medium in open communication with the first controlled atmosphere inside the first sealing chamber;

a flow cell, disposed outside the first sealing chamber, the flow cell comprising a first flow channel, a second flow channel, and a clamping structure configured to hold the membrane spanned over an opening between the flow channels for separating a respective flow through the flow channels by the membrane spanning the opening there between;

a first set of liquid ducts connected to the first flow channel and configured to:

carry the first liquid medium from the first liquid container, through the first barrier to an entrance of the first flow channel into the flow cell, and carry at least part of the first liquid medium exiting the first flow channel from the flow cell back into the first liquid container; and a first flow distributor:

connected to the first set of liquid ducts between the first flow channel and the first sealing chamber, and configured to selectively direct an incoming flow of first liquid medium, at an entry port of the first flow distributor, to respective exit flows at respective exit ports of the first flow distributor;

wherein at least one of the exit ports is connected to a liquid duct through the first barrier for directing at least part of the first liquid medium back into the first liquid container, wherein the first sealing chamber further contains one or more sample containers disposed in the first controlled atmosphere inside the first sealing chamber, wherein the one or more sample containers are configured to receive and hold a liquid sample of the first liquid medium, separate from the first liquid container, and wherein at least one of the exit ports of the first flow distributor is connected to a liquid duct through the first barrier for directing at least part of the first liquid medium into a respective sample container of the one or more sample containers.

2. The system according to claim 1, wherein the first sealing chamber has a capacity of less than five liters.

3. The system according to claim 1, comprising:

a second liquid container configured to hold a second liquid medium; and a second set of liquid ducts connected to the second flow channel and configured to carry a second liquid medium from the second liquid container to an entrance of the second flow channel into the flow cell, wherein the second set of liquid ducts is further configured to carry at least part of the second liquid medium exiting the second flow channel from the flow cell back into the second liquid container.

4. The system according to claim 1, comprising:

a second sealing chamber comprising a second barrier configured to seal an inside of the second sealing chamber from the surrounding environment for maintaining a second controlled atmosphere inside the second sealing chamber, wherein the second liquid container is contained inside the second sealing chamber, and wherein the second liquid container is configured to hold the second liquid medium in open communication with the second controlled atmosphere inside the second sealing chamber.

5. The system according to claim 4, wherein a first flow path through the first set of liquid ducts from the first liquid container through the first flow channel back to the first liquid container has a first path length, wherein a second flow path through the second set of liquid ducts from the second liquid container through the second flow channel back to the second liquid container has a second path length, and wherein the first path length and the second path length are within ten percent.

6. The system according to claim 1, comprising a peristaltic pump arranged in a path of the first set of liquid ducts and/or the second set of liquid ducts, and wherein the peristaltic pump is configured to control a respective flow though the respective flow channels of the flow cell.

7. The system according to claim 1, comprising:

a pressure control system configured to maintain a controlled pressure of the first controlled atmosphere inside the first sealing chamber the same as a pressure of the surrounding environment.

8. The system according to claim 1, comprising:

an atmospheric control valve through the first barrier and configured to connect an atmospheric controller to the first sealing chamber for establishing and/or maintaining a first controlled atmosphere inside the first sealing chamber.

9. The system according to claim 8 comprising the atmospheric controller configured to establish and/or maintain the first controlled atmosphere inside the first sealing chamber.

10. The system according to claim 9, wherein upon connecting the atmospheric controller to the atmospheric control valve, the atmospheric control valve is configured to open an exchange duct through the first barrier for initially establishing the first controlled atmosphere by the atmospheric controller.

11. The system according to claim 10, wherein upon disconnecting the atmospheric controller from the atmospheric control valve, the atmospheric control valve is configured to close the exchange duct for maintaining the first controlled atmosphere in the absence of the atmospheric controller.

12. The system according to claim 1, comprising:

a sensor configured to measure a concentration of oxygen in the first liquid medium in the first liquid container; and an atmospheric resupply unit configured to supply and/or replenish anaerobic-air gas inside the first sealing chamber based on a measured concentration of oxygen by the sensor being above a threshold.

13. The system according to claim 1, comprising:

a first waste container connected to a respective exit port of the first flow distributor and configured to selectively receive at least part of the first liquid medium, wherein the first waste container is disposed outside the first sealing chamber.

14. A method for investigating a membrane, the method comprising:

providing a first sealing chamber comprising a first barrier to seal an inside of the first sealing chamber from a surrounding environment for maintaining a first controlled atmosphere inside the first sealing chamber, providing a first liquid container contained inside the first sealing chamber, wherein the first liquid container holds a first liquid medium in open communication with the first controlled atmosphere inside the first sealing chamber;

providing a flow cell, disposed outside the first sealing chamber, the flow cell comprising a first flow channel, a second flow channel, and a clamping structure holding the membrane spanned over an opening between the flow channels for separating a respective flow through the flow channels by the membrane spanning the opening there between;

providing a first set of liquid ducts connected to the first flow channel and carrying the first liquid medium from the first liquid container, through the first barrier to an entrance of the first flow channel into the flow cell, and carrying at least part of the first liquid medium exiting the first flow channel from the flow cell back into the first liquid container; and a first flow distributor connected to the first set of liquid ducts between the first flow channel and the first sealing chamber, and configured to selectively direct an incoming flow of first liquid medium, at an entry port of the first flow distributor, to respective exit flows at respective exit ports of the first flow distributor;

wherein at least one of the exit ports is connected to a liquid duct through the first barrier for directing at least part of the first liquid medium back into the first liquid container;

wherein the first sealing chamber further contains one or more sample containers disposed in the first controlled atmosphere inside the first sealing chamber receiving and holding a liquid sample of the first liquid medium, separate from the first liquid container, wherein at least one of the exit ports of the first flow distributor is connected to a liquid duct through the first barrier for directing at least part of the first liquid medium into a respective sample container of the one or more sample containers.

15. The method according to claim 14, comprising:

providing a first liquid medium in the first liquid container inside the first sealing chamber;

providing the membrane in the flow cell connected via the first set of liquid ducts to recirculate the first liquid medium via the first flow channel of the flow cell;

establishing the first controlled atmosphere inside the first sealing chamber;

waiting to allow gasses in the first liquid medium to exchange with the first controlled atmosphere; and causing the first liquid medium to flow via the first set of liquid ducts through the first flow channel of the flow cell.

16. The method according to claim 15, wherein the first controlled atmosphere is established by connecting an atmospheric controller to an atmospheric control valve of the first sealing chamber, wherein the atmospheric controller is disconnected from the first sealing chamber after establishing the first controlled atmosphere and while flowing the first liquid medium through the flow cell.

17. The method according to claim 14, wherein the first controlled atmosphere is established by connecting an atmospheric controller to an atmospheric control valve of the first sealing chamber, wherein the atmospheric controller is disconnected from the first sealing chamber after establishing the first controlled atmosphere and while flowing the first liquid medium through the flow cell.

* * * * *